United States Patent Office 3,351,478
Patented Nov. 7, 1967

3,351,478
CONCRETE MIX WITH SET RETARDING ADMIXTURE
Vance H. Dodson, Needham, and Emery Farkas, Newtonville, Mass., assignors to W. R. Grace & Co., Cambridge, Mass., a corporation of Connecticut
No Drawing. Filed June 18, 1964, Ser. No. 376,227
5 Claims. (Cl. 106—90)

ABSTRACT OF THE DISCLOSURE

Concrete compositions containing a set retarding admixture composed of an organic set retarder, e.g. sodium lignosulfonate, and a water soluble sulfate.

---

This invention relates to a new additive composition for incorporation in hydraulic cement mixes, and more particularly to improved concrete, mortar, and neat paste mixes containing said additive composition.

Good water retention is one of the most important factors in providing an acceptable concrete mix because of the desirability of retaining substantially all of the water in the mix before and during the use of the mix in order to avoid premature stiffening. In concrete mixes having poor water retention, there is a tendency for the mix to lose a high proportion of water by evaporation, bleeding, or absorption by porous surfaces which come in contact with the mix. For example, when a porous building unit is imbedded in mortar, water will be absorbed into the porous structure. The water lost in such a situation frequently causes the mortar mix to lose plasticity, which creates difficulties in the placement of such a unit. The mortar may also prematurely stiffen which makes it difficult or impossible for a worker to make any changes in the position of the unit without breaking the adhesion between the placed unit and the concrete which it contacts.

It is customary, therefore, to add to Portland cement concrete, set-retarding admixtures which are generally added in solution with the mix water and which function by altering the rate of hydration of the tricalcium silicate ($C_3S$) component of the cement. Unlike the tricalcium aluminate ($C_3A$) component of the cement, the tricalcium silicate component is slow to hydrate and does not undergo any appreciable reaction with water until after a period of 2 to 6 hours following the addition of the water. The rate of hydration of the $C_3A$ is controlled by intergrinding calcium sulfate with the clinker. If calcium sulfate were not present, the cement would undergo flash set. When a set-retarding admixture is present, it is adsorbed by the $C_3S$ and its hydration products, and this slows down the further hydration of the $C_3S$. As a result, the setting time of the concrete is delayed.

Set-retarding admixtures are generally added to the concrete in solution and along with the water mix. The tricalcium silicate and tricalcium aluminate components of the cement compete, at least initially, for the set-retarding admixture. A portion of the set-retarding admixture is adsorbed by the tricalcium aluminate and/or its hydration products because the admixtures are in solution in the mix water and are immediately available for adsorption. Calcium sulfate, which is interground with the cement, must dissolve in the mix water and becomes available for reaction with the tricalcium aluminate more slowly than the admixture in the solution until after about 30 to 60 seconds of mixing. After that time the formation of calcium sulfoaluminate (the reaction product of calcium sulfate and tricalcium aluminate) proceeds at its normal rate. Initially, the admixture tends to react to a greater degree with the tricalcium aluminate than with the tricalcium silicate before the calcium sulfate solubilizes.

The set-retarder adsorbed by the tricalcium aluminate and/or its hydration products prior to the time when the calcium sulfate is sufficiently in solution to react with the $C_3A$ is no longer available to retard the hydration of the tricalcium silicate, thus reducing the effectiveness of the admixtures.

It has now been found that the effectiveness of common set-retarders can be markedly increased as well as increasing the compressive strength of the concrete by the novel additive of the present invention.

The additive composition comprises a soluble salt of sulfuric acid, i.e., a soluble sulfate, and a common set-retarder. The use of the common set-retarder and the soluble sulfate increases the delay in setting time of the concrete and at the same time increases the 7- and 28-day compressive strength of the concrete.

Preferred soluble sulfates for use in the present invention are the sodium, potassium, and ammonium salts of sulfuric acid. The soluble sulfates are used in a range of between 0.02 to .10 percent by weight based on the dry cement. In a preferred embodiment not more than 0.05 percent soluble sulfate is used because the set time of the concrete is extended beyond the time period normally desired. However, if greater set times are desired, amounts of the sulfate in excess of 0.05 may be used. It is also preferable that less than 0.10 percent of soluble sulfate be used in the admixture since sulfate increases the tendency of the concrete to shrink at levels in excess of 0.10 percent. It should be noted, however, that at levels less than 0.10 percent, no significant increase in shrinkage occurs.

Set-retarders known to the art for use in concrete are used with the soluble sulfate. As examples of suitable set-retarders, mention may be made of lignosulfonic acid; salts of lignosulfonic acid, e.g., calcium, sodium, and ammonium lignosulfonate; gluconic acid and salts of gluconic acid, e.g., sodium and potassium gluconate; adipic acid and salts of adipic acid, e.g., sodium adipate and potassium adipate; tetrahydroxyadipic acid and salts of tetrahydroxyadipic acid and salicylic acid. Only those retarders which are readily adsorbable by the $C_3A$ are suitable for use with the soluble sulfate.

The retarder is used in the admixture in the range of 6:1 to 1:2 ratio of retarder to water soluble sulfate (by weight). With retarders of the lignosulfonic acid type, the ratio range is preferably 6:1 to 1:1. With retarders of the gluconic acid type, the ratio range is preferably 6:1 to 1:2. With retarders of the adipic and tetrahydroxy adipic acid type, the ratio range is preferably 3:1 to 1:1.

Particularly preferred admixture compositions are aqueous solutions containing:

(A)

| | Parts by weight |
|---|---|
| Sodium salt of lignosulfonic acid | 4 |
| Sodium sulfate | 1 |

(B)

| | |
|---|---|
| Sodium salt of gluconic acid | 6 |
| Sodium | 5 |

(C)

| | |
|---|---|
| Sodium salt of adipic acid | 2 |
| Sodium sulfate | 1 |

(D)

| | |
|---|---|
| Sodium salt of tetrahydroxy adipic acid | 2 |
| Sodium sulfate | 1 |

The concretes represented in the examples below contain 5½ sacks (517 pounds) of Type I Portland cement per cubic yard. Each batch was mived to the same degree of workability as measured by the slump test (ASTM C143) by adjusting the water-to-cement ratio in the batch.

The slump of all of the concretes was within the range of about 4 to 4½ inches. A portion of each batch was molded in 4- by 8-inch cylinders for compressive strength measurement in accordance with ASTM C192–62T. A second portion of each batch was tested for its final setting time in accordance with ASTM C403–62. The amount used of the various admixtures shown in each example is expressed in percentage by weight of the dry cement. The admixture was added in solution with the water.

The following nonlimiting examples illustrate the novel admixtures and concretes containing said admixture, as well as the properties of the concretes.

TABLE 1

| Example No. | Set Retarding Admixture | Amount Added (percent by wt. on cement) | Water/Cement Ratio | Time to Final Set, Hr.:Min. | Increase in Set Retardation Over Control, Hr.:Min. | Compressive Strength, p.s.i. | |
|---|---|---|---|---|---|---|---|
| | | | | | | At 7 days | At 28 days |
| 1 | None (control) | | 0.60 | 5:10 | | 2,385 | 4,790 |
| 2 | Lignosulfonic Acid | 0.20 | 0.55 | 6:30 | 1:20 | 2,990 | 5,230 |
| 3 | {Lignosulfonic Acid / Sodium Sulfate} | 0.20 / 0.05 | 0.53 | 7:50 | 2:40 | 3,165 | 5,500 |
| 4 | Calcium Lignosulfonate | 0.20 | 0.55 | 6:40 | 1:30 | 3,000 | 5,350 |
| 5 | {Calcium Lignosulfonate / Sodium Sulfate} | 0.20 / 0.05 | 0.53 | 8:00 | 2:50 | 3,210 | 5,630 |
| 6 | {Calcium Ligonsulfonate / Potassium Sulfate} | 0.20 / 0.05 | 0.53 | 8:10 | 3:00 | 3,280 | 5,500 |
| 7 | Sodium Lignosulfonate | 0.20 | 0.56 | 6:35 | 1:25 | 2,894 | 5,310 |
| 8 | {Sodium Lignosulfonate / Sodium Sulfate} | 0.20 / 0.05 | 0.52 | 7:45 | 2:35 | 3,074 | 5,540 |
| 9 | {Sodium Lignosulfonate / Ammonium Sulfate} | 0.20 / 0.05 | 0.52 | 8:00 | 2:50 | 3,100 | 5,670 |
| 10 | Ammonium Lignosulfonate | 0.20 | 0.56 | 6:45 | 1:35 | 2,730 | 5,000 |
| 11 | {Ammonium Lignosulfonate / Sodium Sulfate} | 0.20 / 0.05 | 0.53 | 8:10 | 3:00 | 3,300 | 5,480 |

It will be noted that in Table 1 the admixtures of this invention further reduces the water/cement ratio, further extends the setting time, and further increases the 7- and 28-day strengths over those effects normally found with lignosulfonate type of retarder.

TABLE 2

| Example No. | Set Retarding Admixture | Amount Added (percent by wt. on cement) | Water/Cement Ratio | Time to Final Set, Hr.:Min. | Increase in Set Retardation Over Control, Hr.:Min. | Compressive Strength, p.s.i. | |
|---|---|---|---|---|---|---|---|
| | | | | | | At 7 days | At 28 days |
| 12 | None (control) | | 0.60 | 5:00 | | 2,400 | 4,750 |
| 13 | Gluconic Acid | 0.06 | 0.58 | 7:50 | 2:50 | 3,000 | 5,330 |
| 14 | {Gluconic Acid / Sodium Sulfate} | 0.06 / 0.05 | 0.57 | 8:50 | 3:50 | 3,300 | 5,510 |
| 15 | Sodium gluconate | 0.06 | 0.58 | 8:00 | 3:00 | 2,960 | 5,200 |
| 16 | {Sodium gluconate / Sodium sulfate} | 0.06 / 0.05 | 0.57 | 9:10 | 4:10 | 3,410 | 5,610 |
| 17 | {Sodium gluconate / Potassium sulfate} | 0.06 / 0.05 | 0.57 | 9:20 | 4:20 | 3,320 | 5,600 |
| 18 | {Sodium gluconate / Ammonium sulfate} | 0.06 / 0.05 | 0.57 | 9:10 | 4:10 | 3,375 | 5,550 |
| 19 | Potassium gluconate | 0.06 | 0.58 | 7:45 | 2:45 | 2,890 | 5,190 |
| 20 | {Potassium gluconate / Potassium sulfate} | 0.06 / 0.05 | 0.57 | 9:00 | 4:00 | 3,260 | 5,480 |
| 21 | {Potassium gluconate / Sodium sulfate} | 0.06 / 0.05 | 0.57 | 9:30 | 4:30 | 3,300 | 5,500 |

Table 2 shows the beneficial effects of the admixtures of this invention in relation to the gluconate type of retarder. In comparison with prior art concretes, the concretes containing the admixtures of this invention possess a reduced water/cement ratio, an extended setting time, and increased 7- and 28-day compressive strengths.

TABLE 3

| Example No. | Set Retarding Admixture | Amount Added (percent by wt. on cement) | Water/Cement Ratio | Time to Final Set, Hr.:Min. | Increase in Set Retardation Over Control, Hr.:Min. | Compressive Strength, p.s.i. | |
|---|---|---|---|---|---|---|---|
| | | | | | | At 7 days | At 28 days |
| 22 | None (control) | | 0.60 | 5:30 | | 2,350 | 4,830 |
| 23 | Adipic acid | 0.10 | 0.58 | 8:00 | 2:30 | 2,790 | 5,280 |
| 24 | {Adipic acid / Sodium sulfate} | 0.10 / 0.05 | 0.57 | 8:50 | 3:20 | 3,100 | 5,560 |
| 25 | Sodium adipate | 0.10 | 0.57 | 7:50 | 2:20 | 2,830 | 5,360 |
| 26 | {Sodium adipate / Potassium sulfate} | 0.10 / 0.05 | 0.57 | 8:45 | 3:15 | 3,110 | 5,500 |
| 27 | Potassium adipate | 0.10 | 0.58 | 8:10 | 2:40 | 2,800 | 5,300 |
| 28 | {Potassium adipate / Sodium sulfate} | 0.10 / 0.05 | 0.57 | 9:00 | 3:30 | 3,000 | 5,610 |
| 29 | Tetrahydroxy adipic acid | 0.10 | 0.57 | 7:45 | 2:15 | 2,750 | 5,290 |
| 30 | {Tetrahydroxy adipic acid / Ammonium sulfate} | 0.10 / 0.05 | 0.57 | 8:45 | 3:15 | 3,210 | 5,500 |
| 31 | Sodium salt of tetrahydroxy adipic acid | 0.10 | 0.58 | 8:10 | 2:40 | 2,910 | 5,190 |
| 32 | {Sodium salt of tetrahydroxy adipic acid / Sodium sulfate} | 0.10 / 0.05 | 0.57 | 9:15 | 3:45 | 3,250 | 5,430 |
| 33 | {Sodium salt of tetrahydroxy adipic acid / Potassium sulfate} | 0.10 / 0.05 | 0.57 | 9:00 | 3:30 | 3,360 | 5,400 |

Table 3 shows the beneficial effects imparted to concrete by the admixtures of this invention which contain the adipate type of retarder.

It should be understood that the term concrete as used herein is intended to include mortar and neat paste since the beneficial effects of the composition of this invention are achieved in all three.

Other additives known to the art (e.g., air entraining agents) may also be utilized in concretes with the novel admixtures of this invention so long as they do not interfere with the retarding action of the admixture.

As stated above, the admixture is preferably added to the concrete as an aqueous solution. Although it may be added separately, it is preferably added with the mix water. It can be readily seen that the solids content of the admixture solution may be varied over a wide range. Preferably, the admixture is in a solution of 35 percent solids.

What is claimed is:

1. A concrete mix comprising a Portland cement and a set-retarding admixture comprising (a) a retarder selected from the group consisting of lignosulfonic acid and salts thereof, gluconic acid and salts thereof and adipic acids and salts thereof and (b) a water soluble sulfate wherein the ratio of (a) to (b) is 6:1 to 1:2 and (b) is present at a level ranging from 0.02 to 10% by weight based on the weight of the cement.

2. A product as defined in claim 1 wherein said water soluble sulfate is sodium sulfate.

3. A product as defined in claim 1 wherein said water soluble sulfate is potassium sulfate.

4. A product as defined in claim 1 wherein said water soluble sulfate is ammonium sulfate.

5. A product as defined in claim 1 wherein the ratio of (a) to (b) is 6:1 to 1:1 parts by weight.

References Cited

UNITED STATES PATENTS

| | | | |
|---|---|---|---|
| 1,997,782 | 4/1935 | Windecker | 106—89 |
| 2,174,051 | 9/1939 | Winkler | 106—90 |
| 2,672,424 | 3/1954 | Avery | 106—89 |
| 2,673,810 | 3/1954 | Ludwig | 106—315 |
| 2,806,530 | 9/1957 | Binkley | 106—89 |
| 2,819,171 | 1/1958 | Scripture et al. | 106—90 |
| 3,053,673 | 9/1962 | Walker | 106—90 |
| 3,071,481 | 1/1963 | Beach et al. | 106—90 |
| 3,086,273 | 4/1963 | Welborn | 106—90 |

TOBIAS E. LEVOW, *Primary Examiner.*

S. E. MOTT, *Assistant Examiner.*